United States Patent
Liu et al.

(10) Patent No.: US 8,273,986 B2
(45) Date of Patent: Sep. 25, 2012

(54) DEVICE HOUSING AND METHOD FOR MAKING THE SAME

(75) Inventors: Yue-Ping Liu, Shenzhen (CN); Liang Xiong, Shenzhen (CN); Hsiang-Jung Su, Taipei Hsien (TW); Wen-Te Lai, Taipei Hsien (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 296 days.

(21) Appl. No.: 12/845,914

(22) Filed: Jul. 29, 2010

(65) Prior Publication Data

US 2011/0120901 A1    May 26, 2011

(30) Foreign Application Priority Data

Nov. 20, 2009   (CN) .......................... 2009 1 0310133

(51) Int. Cl.
*H01R 13/46*   (2006.01)
*H04M 1/00*   (2006.01)

(52) U.S. Cl. ................ 174/60; 455/575.1; 455/575.8

(58) Field of Classification Search ............ 174/50.51, 174/377, 520, 350, 372, 385, 60, 50.5; 206/524.6, 206/524.3; 455/550.1, 575.1, 575.8; 29/527.2; D11/141; D9/414, 423, 424; 361/742, 758, 361/804

See application file for complete search history.

(56) References Cited

U.S. PATENT DOCUMENTS

| | | | | |
|---|---|---|---|---|
| 5,613,223 | A * | 3/1997 | Ross et al. ................. | 455/575.1 |
| 5,819,163 | A * | 10/1998 | Tsukamoto et al. ........ | 455/575.1 |
| 6,542,372 | B1 * | 4/2003 | Paquin et al. ................. | 361/758 |
| 6,721,651 | B1 * | 4/2004 | Minelli ........................ | 701/538 |
| 6,942,153 | B1 * | 9/2005 | Yuan et al. ............... | 235/472.01 |
| 7,092,520 | B2 * | 8/2006 | Fuhrmann et al. ........ | 379/433.11 |
| 7,299,077 | B2 * | 11/2007 | Pan ............................. | 455/575.3 |
| 7,373,180 | B2 * | 5/2008 | Swanson et al. ............. | 455/566 |
| 7,583,510 | B2 * | 9/2009 | Wang ............................ | 361/753 |
| 7,649,744 | B2 * | 1/2010 | Zadesky et al. ............... | 361/752 |
| 7,812,256 | B2 * | 10/2010 | Zhan ............................... | 174/50 |
| 7,912,520 | B2 * | 3/2011 | Choi et al. ................. | 455/575.1 |
| 8,164,887 | B2 * | 4/2012 | Cheng ........................ | 361/679.09 |
| 2002/0187818 | A1 * | 12/2002 | Kang ............................ | 455/575 |
| 2003/0100275 | A1 * | 5/2003 | Hsu et al. ....................... | 455/90 |
| 2003/0195020 | A1 * | 10/2003 | Kubo ......................... | 455/575.1 |
| 2005/0136967 | A1 * | 6/2005 | Jeon .......................... | 455/550.1 |
| 2006/0258325 | A1 * | 11/2006 | Tsutaichi et al. ............. | 455/350 |
| 2009/0194308 | A1 * | 8/2009 | Cheng et al. .................. | 174/50 |
| 2010/0012472 | A1 * | 1/2010 | Yang et al. ................. | 200/302.1 |
| 2010/0056232 | A1 * | 3/2010 | Lim et al. ................... | 455/575.1 |
| 2010/0326720 | A1 * | 12/2010 | Tsao et al. .................... | 174/546 |
| 2011/0048754 | A1 * | 3/2011 | Xiong et al. .................... | 174/50 |
| 2012/0097412 | A1 * | 4/2012 | Wennemer et al. ............ | 174/50 |

* cited by examiner

*Primary Examiner* — Dameon Levi
*Assistant Examiner* — Abhishek Rathod
(74) *Attorney, Agent, or Firm* — Altis Law Group, Inc.

(57) ABSTRACT

A device housing for an electronic device is provided. The device housing includes a main body and a decorative member. The main body and the decorative each has a metallic coating with a different color. The decorative member is positioned within the main body to form a desired symbol, logo, or pattern thereon.

19 Claims, 4 Drawing Sheets

DEVICE HOUSING AND METHOD FOR MAKING THE SAME

BACKGROUND

1. Technical Field

The present disclosure relates to a device housing for electronic devices and a method for making the device housing.

2. Description of Related Art

Shells for portable electronic devices are usually decorated with symbols, logos, or patterns to attract consumers. A typical method for making these decorations on a metal shell includes the following steps: covering portions of the shell with an ink having enough hardness and adhesion that it cannot be brushed off; brushing the entire surface of the shell with a grinding wheel to give the surface a pattern of fine lines; removing the ink; and vacuum depositing a metallic coating on the entire surface of the shell. The covering of the ink prevents the protected portions from being brushed off, and accordingly forming a predetermined symbol or logo thereon. However, when the metallic coating is dark colored, such as black and dark blue, the metallic coating has a relative low brilliance, causing the symbol or logo to not have the contrast desired.

Therefore, there is room for improvement within the art.

BRIEF DESCRIPTION OF THE DRAWINGS

Many aspects of the present device housing and method for making the same can be better understood with reference to the drawing. The components in the drawing are not necessarily drawn to scale, the emphasis instead being placed upon clearly illustrating the principles of the present device housing and method for making the same.

DETAILED DESCRIPTION

Figure 1:
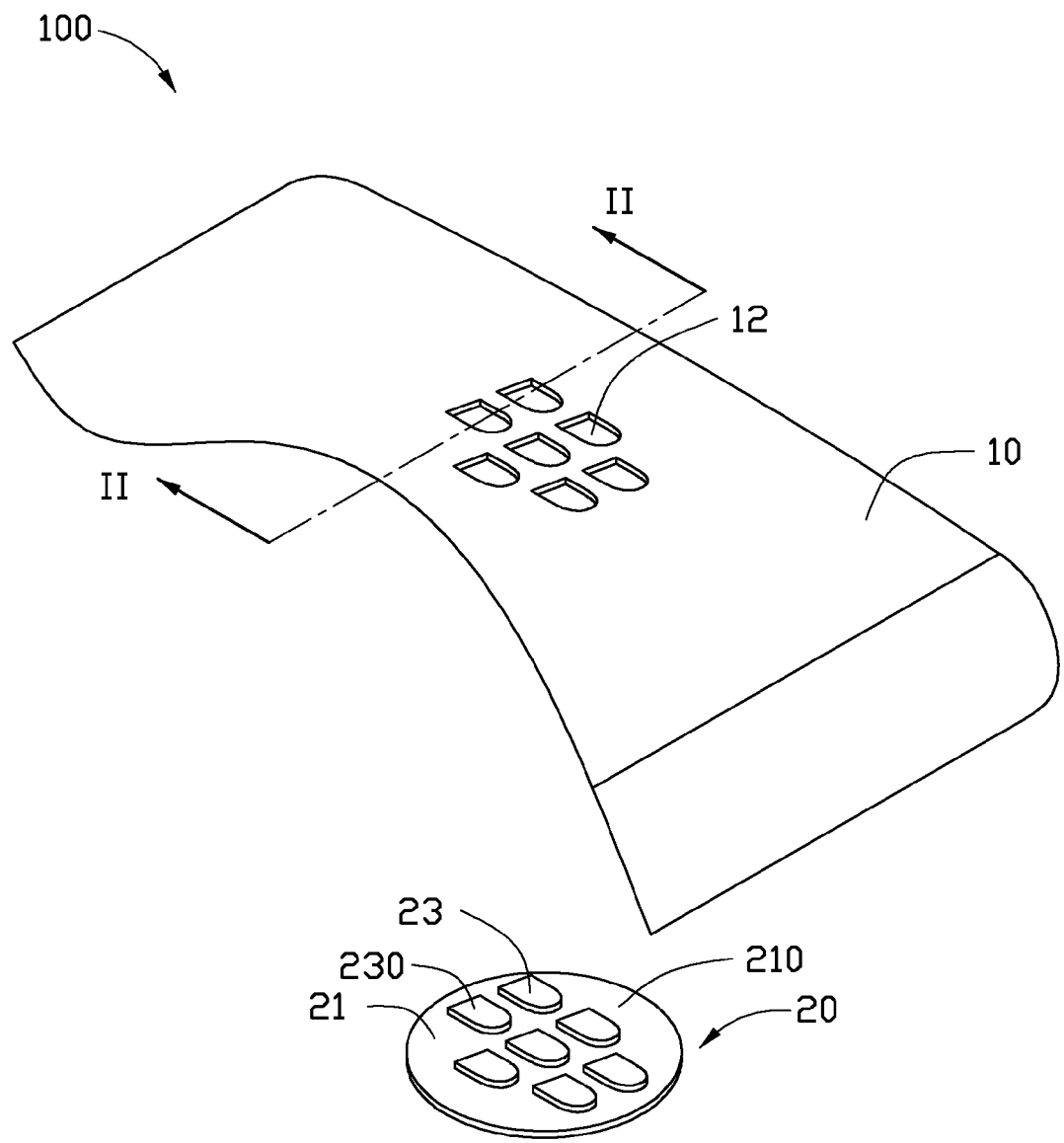
FIG. 1 is a partial exploded view of the present device housing according to an exemplary embodiment.

FIG. 1 shows an exemplary device housing 100 for electronic devices (such as mobile phones). In this exemplary embodiment, the device housing 100 is a cover of a mobile phone. The device housing 100 includes a main body 10 and a decorative member 20. The decorative member 20 is positioned within the main body 10 to form a desired symbol, logo, or pattern thereon.

Figure 2:
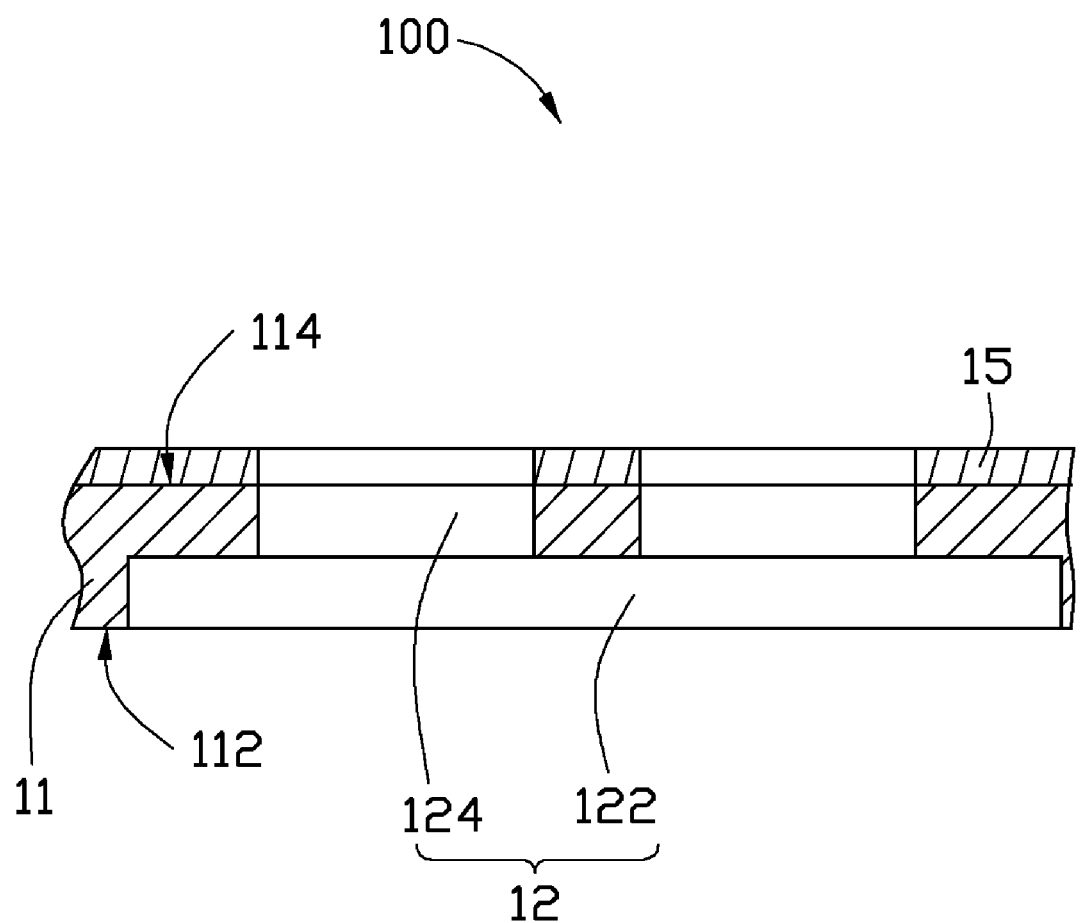
FIG. 2 is schematic cross-section view of a main body of the present device housing according to an exemplary embodiment.

Referring to FIG. 2, the main body 10 includes a substrate 11, a receiving portion 12 defined in the substrate 11, and a first metallic coating 15 formed on the substrate 11. The substrate 11 may be made of a material selected from one of the stainless steel, magnesium, magnesium alloy, aluminum, aluminum alloy, titanium, and titanium alloy for example. The substrate 11 has an inner surface 112 and an opposite outer surface 114. The receiving portion 12 includes a recess 122 through the inner surface 112 and a plurality of holes 124 communicating with the recess 122 and through the outer surface 114 of the substrate 11. The holes 124 are designed to depict a desired symbol, logo, or pattern on the outer surface 114. The receiving portion 12 is used to receive the decorative member 20. The first metallic coating 15 is formed on the outer surface 114 to achieve a metallic appearance. The first metallic coating 15 has a first color and may be a vacuum deposited coating or an electroplated coating. In this exemplary embodiment, the first metallic coating 15 is a vacuum deposited coating. To present a better decoration, the outer surface 114 may form a brushed texture of very fine lines.

Figure 4:
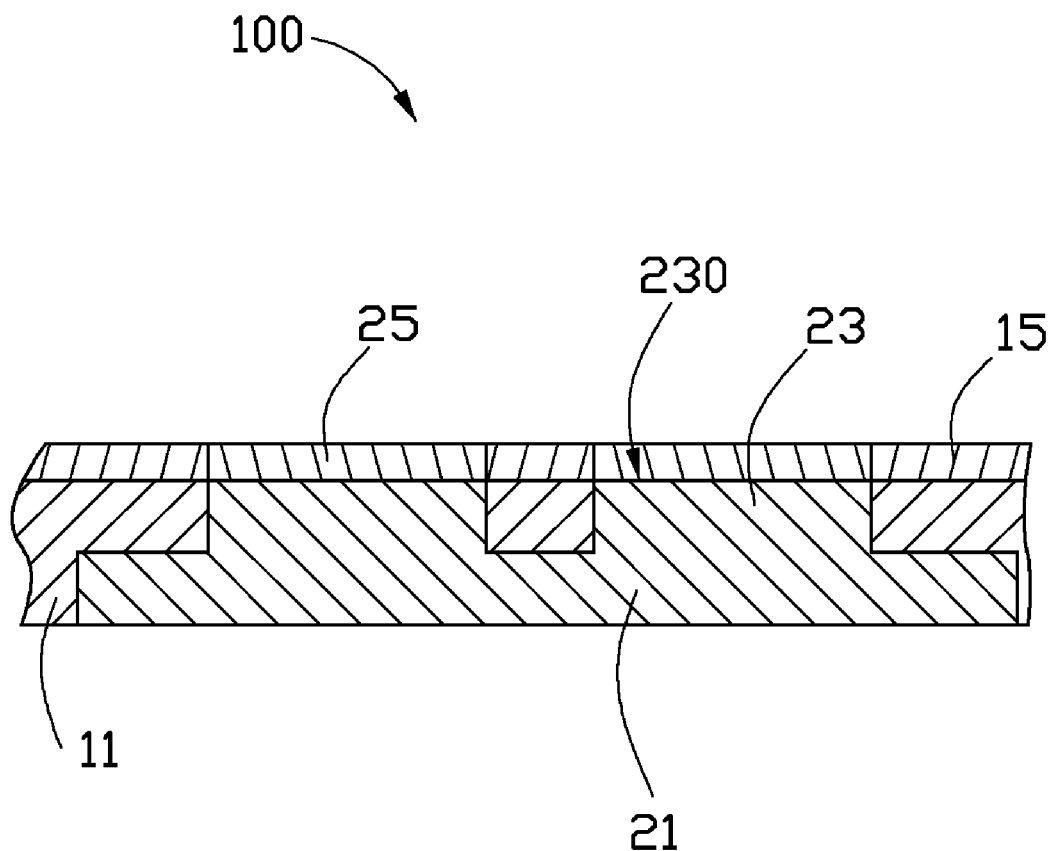
FIG. 4 is a cross-section view of the device housing show in FIG. 3 taken along line IV-IV.

Referring to FIGS. 1 and 4, the decorative member 20 includes a base 21, a plurality of protrusion blocks 23 protruding from the base 21, and a second metallic coating 25 (best shown in FIG. 4). The base 21 has a shape and size generally corresponding to the recess 122. The protrusion blocks 23 protrude from one surface 210 of the base 21. The protrusion blocks 23 are arranged corresponding to the holes 124. The base 21 is wider than each of the protrusion blocks 23. The second metallic coating 25 is at least formed on an end portion 230 of the protrusion blocks 23 distal from the base 21. The second metallic coating 25 may be formed on the entire surface of the decorative member 20. The second metallic coating 25 has a second color different from the first metallic coating 15. The second metallic coating 25 may be a vacuum deposited coating or an electroplated coating. In this exemplary embodiment, the second metallic coating 25 is a vacuum deposited coating. The material and/or materials used in manufacturing the base 21 and the protrusion blocks 23 is a metal powder or powders such as, stainless steel, magnesium, magnesium alloy, aluminum, aluminum alloy, titanium, or titanium alloy. The base 21 and the protrusion blocks 23 are an integrated component.

Figure 3:
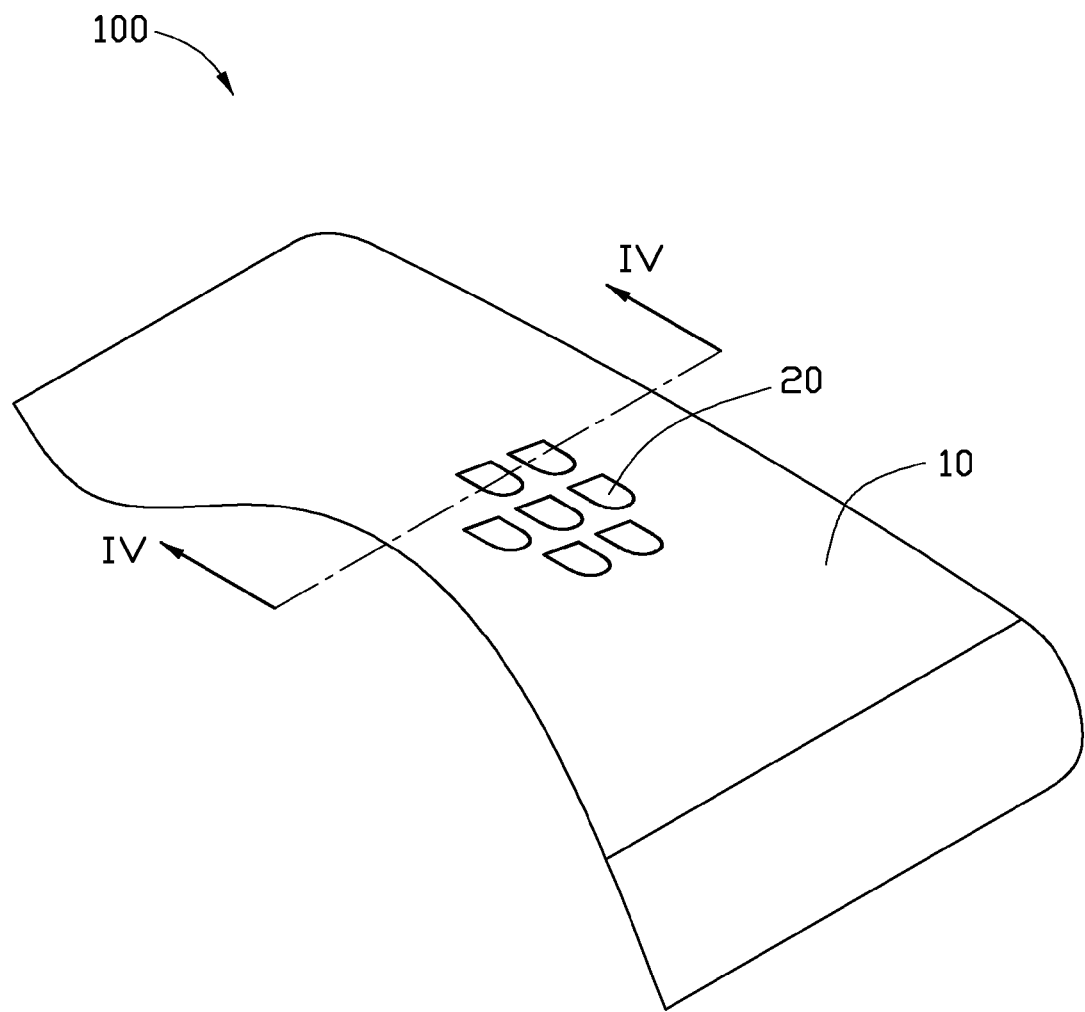
FIG. 3 is a partial assembled view of the present housing according to an exemplary embodiment.

Referring to FIGS. 3 and 4, the decorative member 20 is received in the receiving portion 12. The base 21 is accommodated in the recess 122 and the protrusion blocks 23 is accommodated in the holes 124 and exposed out of the outer surface 114. The protrusion blocks 23 with the second metallic coating 25 may be coplanar with the substrate 11 with the first metallic coating 15.

An exemplary method for making the device housing 100 may include the following steps.

The substrate 11 having the inner surface 112 and the outer surface 114 is provided. The substrate 11 may be manufactured by, for example, stamping.

The receiving portion 12 is defined in the substrate 11. Specifically, this step may include using a computer numerically controlled (CNC) milling machine to process the recess 122 first, and then stamping the holes 124.

The first metallic coating 15 can be formed on the outer surface 114 by vacuum deposition or electroplating. In this exemplary embodiment, the first metallic coating 15 is formed by vacuum deposition.

A rough decorative member (the decorative member 20 without the second metallic coating 25), may be manufactured by a metal injection molding (MIM) using metal powder materials such as, stainless steel powder 304L, 316L, or 420, or selected from magnesium, magnesium alloy, aluminum, aluminum alloy, titanium, and titanium alloy. The rough decorative member has a shape the same as the receiving portion 12 and includes the base 21 and the protrusion blocks 23. The size of the rough decorative member may be equal to or larger than the size of the receiving portion 12. In this exemplary embodiment, the rough decorative member has a larger size than the receiving portion 12.

When the size of the rough decorative member is larger than the size of the receiving portion 12, a chemical etching process may be applied for diminishing the size of the rough decorative member to be substantially corresponding to the receiving portion 12. The chemical etching process can be carried out in an etching solution containing hydrochloric acid and ferric ions.

The etched rough decorative member may be further abraded to achieve a smooth and polished surface, because the rough decorative member may have a rough surface following the chemical etching process.

The rough decorative member is processed by vacuum deposition or electroplating. During this step, the second metallic coating 25 is formed at least on the end portion 230 of the protrusion blocks 23, thus the decorative member 20 is achieved. In this exemplary embodiment, the second metallic coating 25 is formed by vacuum deposition.

The decorative member 20 can be welded to the receiving portion 12. The base 21 is accommodated in the recess 122 and the protrusion blocks 23 are accommodated in the holes 124. A carbon dioxide ($CO_2$) laser may be used for welding. To prevent melted material of the decorative member 20 from spilling over the first metallic coating 15 and damaging the appearance of the device housing 100, a shield tool like a template (not shown) may be used to protect the first metallic coating 15.

In the process for making the device housing 100, when the rough decorative member has a size substantially corresponding to the receiving portion 12, the chemical etching process may be omitted.

The method for manufacturing the device housing 100 can further include a step as of before forming the first metallic coating 15, brushing (or abrading) the outer surface 114 of the substrate 11 with, such as a fine grit sandpaper, to give the outer surface 114 a pattern of very fine lines.

However, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A device housing, comprising:
   a main body, the main body including a metal substrate, a receiving portion, and a first metallic coating, the substrate having an outer surface and an opposite inner surface, the receiving portion having a recess through the inner surface and a plurality of holes communicating with the recess and through the outer surface, the first metallic coating formed on the outer surface; and
   a decorative member, the decorative member including a base, a plurality of protrusion blocks protruding from the base, and a second metallic coating formed at least on the protrusion blocks, the base received in the recess, the protrusion blocks received in the holes and exposed out of the outer surface.

2. The device housing as claimed in claim 1, wherein the first metallic coating and the second metallic coating have different colors.

3. The device housing as claimed in claim 1, wherein the first metallic coating and the second metallic coating both are vacuum deposited coating or electroplated coating.

4. The device housing as claimed in claim 1, wherein the protrusion blocks with the second metallic coating are coplanar with the substrate with the first metallic coating.

5. The device housing as claimed in claim 1, wherein the protrusion blocks form a symbol, logo, or pattern on the device housing.

6. The device housing as claimed in claim 1, wherein the base is wider than the protrusion blocks.

7. The device housing as claimed in claim 1, wherein the substrate is selected from one of the stainless steel, magnesium, magnesium alloy, aluminum, aluminum alloy, titanium, and titanium alloy.

8. The device housing as claimed in claim 1, wherein the base and the protrusion blocks are integrally formed and made of a metal powder selected from one of the stainless steel, magnesium, magnesium alloy, aluminum, aluminum alloy, titanium, and titanium alloy.

9. The device housing as claimed in claim 1, wherein the outer surface of the substrate forms a brushed texture of very fine lines.

10. A method for making a device housing, comprising:
    providing a metal substrate, the substrate having an outer surface and an opposite inner surface;
    defining a receiving portion in the substrate, the receiving portion including a recess through the inner surface and a plurality of holes communicating with the recess and through the outer surface;
    forming a first metallic coating on the outer surface;
    forming a rough decorative member including a base and a plurality of protrusion blocks protruding from the base by metal powder injection molding, the rough decorative member having a shape corresponding to the receiving portion;
    abrading and polishing the rough decorative member;
    forming a second metallic coating at least on the protrusion blocks to achieve a decorative member; and
    securing the decorative member in the receiving portion by welding, with the base received in the recess and the protrusion blocks received in the holes.

11. The method as claimed in claim 10, wherein the first metallic coating and the second metallic coating have different colors.

12. The method as claimed in claim 10, wherein the recess is formed by computer numerically controlled machining, the holes are formed by stamping.

13. The method as claimed in claim 10, wherein before the abrading step, the size of the rough decorative member is larger than the size of the receiving portion.

14. The method as claimed in claim 13, wherein the method further comprising before the abrading, chemical etching the rough decorative member for diminishing the size of the rough decorative member to be substantially corresponding to the receiving portion.

15. The method as claimed in claim 10, wherein the method further comprising using a shield tool to shield and protect the first metallic coating in the welding step.

16. The method as claimed in claim 10, wherein a carbon dioxide laser is used for welding.

17. The method as claimed in claim 10, wherein the method further comprising before forming the first metallic coating, brushing the outer surface of the substrate to form a pattern of very fine lines on the outer surface.

18. The method as claimed in claim 10, wherein the first metallic coating and the second metallic coating both are formed by vacuum deposition or electroplating.

19. The method as claimed in claim 10, wherein the substrate and the rough decorative member are selected from one of the stainless steel, magnesium, magnesium alloy, aluminum, aluminum alloy, titanium, and titanium alloy.

* * * * *